(12) United States Patent
Kassai et al.

(10) Patent No.: US 10,610,966 B2
(45) Date of Patent: Apr. 7, 2020

(54) WELDED STRUCTURE AND MANUFACTURING METHOD THEREOF

(71) Applicant: Panasonic Intellectual Property Management Co., Ltd., Osaka (JP)

(72) Inventors: Takaaki Kassai, Osaka (JP); Koji Funami, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 49 days.

(21) Appl. No.: 15/910,060

(22) Filed: Mar. 2, 2018

(65) Prior Publication Data
US 2018/0281111 A1    Oct. 4, 2018

(30) Foreign Application Priority Data
Mar. 31, 2017   (JP) .................. 2017-070725

(51) Int. Cl.
| | |
|---|---|
| B23K 26/26 | (2014.01) |
| H01M 2/02 | (2006.01) |
| B23K 26/082 | (2014.01) |
| B23K 26/0622 | (2014.01) |
| B23K 26/354 | (2014.01) |
| B23K 26/06 | (2014.01) |
| B23K 26/244 | (2014.01) |
| H01M 2/22 | (2006.01) |
| B23K 101/36 | (2006.01) |
| B23K 103/10 | (2006.01) |

(52) U.S. Cl.
CPC ......... *B23K 26/26* (2013.01); *B23K 26/0622* (2015.10); *B23K 26/0626* (2013.01); *B23K 26/082* (2015.10); *B23K 26/244* (2015.10); *B23K 26/354* (2015.10); *H01M 2/022* (2013.01); *H01M 2/22* (2013.01); *B23K 2101/36* (2018.08); *B23K 2103/10* (2018.08); *H01M 2220/20* (2013.01)

(58) Field of Classification Search
None
See application file for complete search history.

(56) References Cited

U.S. PATENT DOCUMENTS

2010/0247992 A1    9/2010   Miyata et al.

FOREIGN PATENT DOCUMENTS

| | | | | |
|---|---|---|---|---|
| JP | 2004-158318 | | 6/2004 | |
| JP | 2004158318 A | * | 6/2004 | .............. H01M 2/30 |
| JP | 4647707 B | | 3/2011 | |

* cited by examiner

*Primary Examiner* — Karie O'Neill Apicella
(74) *Attorney, Agent, or Firm* — Greenblum & Bernstein, P.L.C.

(57) ABSTRACT

When a linear welding trace is formed by welding a battery case and an electrode tab, an output of the laser increases to a first output during a first period after laser irradiation start to melt the battery case until the electrode tab is melted with the first output, the first output is maintained during a second period to melt the electrode tab and the battery case, the output of the laser decreases from the first output to a second output for melting only the battery case, and the second output is maintained until formation of the welding trace is completed or the laser output is decreased from the second output by an amount that is less than the decrease amount when the laser output decreased from the first output to the second output.

9 Claims, 16 Drawing Sheets

WELDED STRUCTURE AND MANUFACTURING METHOD THEREOF

TECHNICAL FIELD

The present disclosure relates to a welded structure and a manufacturing method thereof.

BACKGROUND

A sealed secondary battery such as a non-aqueous electrolyte secondary battery represented by a high capacity lithium ion secondary battery is widely used as a driving power source for a portable device or the like or a storage battery for a household or a vehicle.

FIG. 8 is a sectional view schematically illustrating a configuration of a sealed secondary battery. In the sealed secondary battery, electrode group 4 formed by laminating or winding positive electrode plate 1 and negative electrode plate 2 via separator 3 is accommodated in battery case 5 together with an electrolyte and an opening portion of battery case 5 has a sealed structure which is sealed with sealing plate 10 via gasket 6. Positive electrode tab 11 introduced from one electrode plate (for example, positive electrode plate) of electrode group 4 is joined to sealing plate 10 also serving as one external terminal and a negative electrode tab (not illustrated in FIG. 8) led out from the other negative electrode plate of electrode group 4 is joined to battery case 5 also serving as the other external terminal.

As a method of the related art which welds by irradiating a battery case made of a metal such as iron or SUS and a negative electrode tab made of nickel or copper with a laser, there is a method which welds by irradiating the battery case and the negative electrode tab with the laser from an outside of battery case 5 (for example, see Japanese Patent Unexamined Publication No. 2004-158318). FIG. 9 and FIG. 10 are views illustrating welding of battery case bottom portion 13 and negative electrode tab 14 of battery case 5 of the related art described in Japanese Patent Unexamined Publication No. 2004-158318.

In FIG. 9, electrode group 4 formed by spirally winding a positive electrode plate and a negative electrode plate via a separator is inserted into cylindrical battery case 5, and negative electrode tab 14 welded to the negative electrode plate overlaps bottom portion 13 of battery case 5 at a central portion of battery case 5, negative electrode tab 14 is in contact with bottom portion 13 of battery case 5 by contact rod 12, pulse laser 7 is emitted from the outside of battery case 5, and thus battery case bottom portion 13 and a portion of negative electrode tab 14 of battery case 5 are welded.

In the configuration disclosed in Japanese Patent Unexamined Publication No. 2004-158318, pulse laser 7 is emitted from the outside of battery case 5, while the temperature of the tab surface is measured, a plurality of pulse irradiations are continued until the signal thereof exceeds a predetermined threshold value.

Although a method of emitting pulse laser 7 from negative electrode tab 14 inside battery case 5 is also conceivable, there is a possibility that pulse laser 7 hits and burns electrode group 4 and when a by-product such as spatter and debris which is generated at the time of welding remains inside battery case 5, it causes a short-circuit failure, so it is considered that the method of emitting pulse laser 7 from the outside of battery case 5 described in Japanese Patent Unexamined Publication No. 2004-158318 is preferable.

FIG. 10 is a sectional view illustrating a joining portion between battery case bottom portion 13 and negative electrode tab 14 of battery case 5 of FIG. 9 and melting proceeds from the surface of battery case bottom portion 13 by emitting pulse laser 7 from battery case bottom portion 13 side, welded portion 15 having a linear welding trace reaches the joining surface with negative electrode tab 14 as the irradiation time elapses, further, the laser irradiation is stopped in a state where welded portion 15 further proceeds to the inside of negative electrode tab 14, and thus case bottom portion 13 and negative electrode tab 14 of battery case 5 are joined to each other. Generally, in welding by the pulse laser, since a plurality of irradiations are continued at the same place, the heat of the laser concentrates on one point, and this heat is transferred by heat conduction into the material, the welding area of welded portion 15 of battery case bottom portion 13 on the irradiation side of pulse laser 7 increases.

In addition, as a method of the related art which welds by irradiating a sealing plate made of a metal such as aluminum and a positive electrode tab made of aluminum or the like with a laser, there is method which welds the other end of the tab to the sealing plate by the laser by abutting the other end of the tab against the sealing plate and emitting from the tab side while continuously scanning the other end of the tab with a fiber laser beam having a spot diameter less than the thickness of the tab (for example, see Japanese Patent No. 4647707).

In the configuration disclosed in Japanese Patent No. 4647707, deep penetration type welding (keyhole welding) is performed with a smaller spot diameter using a fiber laser.

The keyhole welding will be described in detail with reference to FIG. 11. In a case where the power density of the laser is high, the surface of the laser irradiation portion is heated to the evaporation temperature or higher, the surface is recessed by reaction force during evaporation and thus a deep keyhole is formed. In the keyhole, the laser is absorbed by the Fresnel (absorption by multiple reflections) at the keyhole inner wall surface (generally, front wall surface in traveling direction) or the bottom portion, and metal vapor (plume) is generated and is ejected from the keyhole opening. The penetration depth of the keyhole type melt welded portion is determined by the depth of the keyhole and molten metal flow from a tip of the keyhole. Here, a portion where the molten metal flow convects while the laser beam is traveling is called a molten pool. In this molten pool, heat is diffused by heat conduction to the surrounding material and heat convection into the atmosphere, and the molten pool gradually cools and solidifies.

FIG. 12 and FIG. 13 are views illustrating welding of sealing plate 10 and positive electrode tab 11 of the related art described in Japanese Patent No. 4647707. FIG. 12 is a plan view illustrating a method of the related art described in Japanese Patent No. 4647707 of laser welding positive electrode tab 11 to sealing plate 10. In addition, FIG. 13 is a view illustrating a cross section of a welded portion including positive electrode tab 11 and sealing plate 10.

In FIG. 13, the end portion of positive electrode tab 11 led out from the electrode group is continuously scanned with a continuous oscillating laser 16 having a spot diameter less than the thickness of positive electrode tab 11 along the width direction of positive electrode tab 11 in a state of being abutted against sealing plate 10 and thus welded portion 15 is formed and the end portion of positive electrode tab 11 is welded to sealing plate 10 by the laser.

SUMMARY

However, in the structure described above, there is a problem that a keyhole is generated.

In the present disclosure, an object thereof is to provide a welded structure and a manufacturing method thereof, which can suppress a possibility of generation of a keyhole with high reliability.

In order to achieve the above-mentioned object, according to the present disclosure, there is provided a manufacturing method of a welded structure which is welded by scanning an outer surface of a battery case with a laser in a state where an inner surface of the battery case is in close contact with an electrode tab, the method including: forming a linear welding trace by relative movement between the laser and the battery case, in which in the forming, the output of the laser increases to a first output during a first period after laser irradiation start to melt the battery case until the electrode tab is melted with the first output, the first output is maintained during a second period to melt the electrode tab and the battery case, the output of the laser decreases from the first output to a second output for melting only the battery case, and the second output is maintained until formation of the welding trace is completed or the laser output is decreased from the second output by an amount that is less than the decrease amount when the laser output decreased from the first output to the second output.

As described above, according to the present disclosure, after melting the electrode tab and the battery case, after decreasing the output of the laser to the second output for melting only the battery case, the second output is maintained until formation of the welding trace is completed or the laser output is decreased from the second output by an amount that is less than the decrease amount when the laser output decreased from the first output to the second output. This makes it possible to increase the melting amount at the laser termination portion, for example, even if keyholes are generated due to the interposition of resin-based foreign matter at the interface between the battery case and the electrode tab, the generation of the keyhole can be suppressed by filling the keyhole with the large melting amount.

DETAILED DESCRIPTION OF PREFERRED EMBODIMENTS

Figure 1:
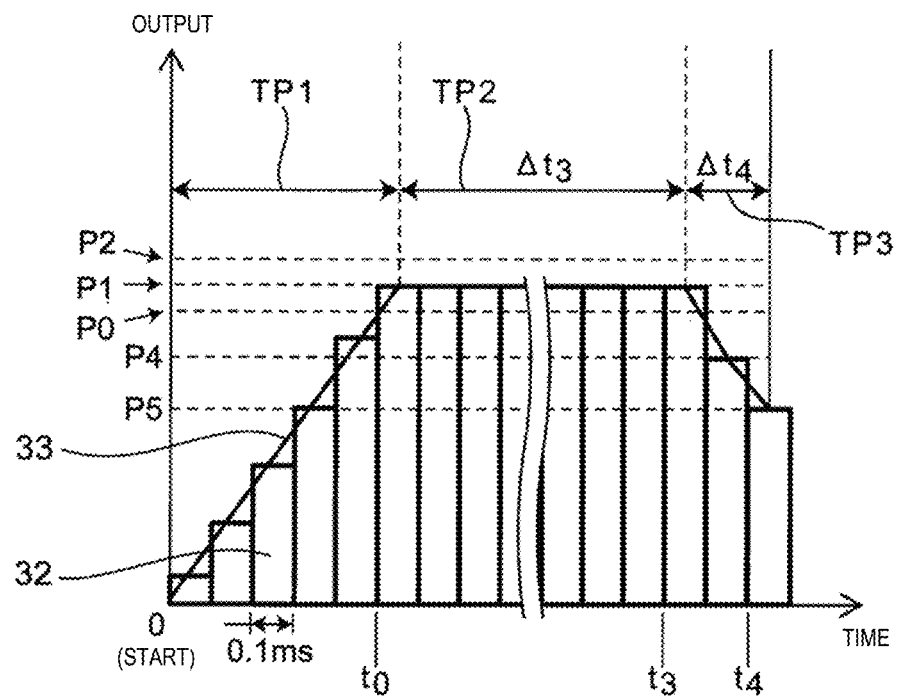
FIG. 1 is a diagram illustrating laser output control with respect to elapsed time in Embodiment 1.

Hereinafter, the present embodiment will be described with reference to the drawings. In the drawings described below, in the graph in which the horizontal axis is time, the start time of the output change command is the time on the left side of the bar graph.

First, findings leading to this embodiment will be described.

In a case where the resin-based foreign matter such as PET, oil, or the like adhered to the surface of battery case bottom portion 13 or negative electrode tab 14 generated in the manufacturing process or adhered in the previous process is touched by the multiple reflection laser at the inner wall surface or the bottom portion of the keyhole at the time of welding, the resin-based foreign matter or oil rapidly sublimes, volumetrically expands, and gas is generated. This gas is ejected from the keyhole port, and at this time, the molten metal flow around the keyhole is also blown off, spatter is generated, and a hole larger than the ordinary keyhole is generated. In keyhole welding, welding progresses while filling the generated keyhole due to the molten metal flow from the front with respect to the welding direction, and when this molten metal flow amount is large, it is possible to fill the generated hole.

However, since the iron or SUS used for battery case 5 has a heat conductivity as low as about ¼ or a melting point as large as about 2.5 times as compared with the aluminum to be welded described in Japanese Patent No. 4647707, the generated amount of molten metal flow is small.

In particular, since the laser beam is gradually weakened at the termination portion of the laser irradiation, the amount of molten metal flow generated in a scan forward direction also gradually decreases and thus filling of the generated hole is unlikely to be performed.

In addition, since the amount of molten metal flow decreases at the time of laser irradiation, as described in Japanese Patent No. 4647707, between battery case bottom portion 13 and negative electrode tab 14, resistance to a resin-based foreign matter such as interposed resin or oil is weakened and thus there is a problem that the hole is likely to be opened in a can during laser welding. If holes are opened in the can, electrolyte leakage is generated.

The process of generating the through-hole at the bottom portion of the battery case which is specifically described above will be described with reference to FIG. 14 to FIG. 17. Although FIG. 14 and FIG. 16 are sectional views since when hatching is added therein the drawings are unlikely to be understood, hatching is omitted therefrom.

Figure 14:
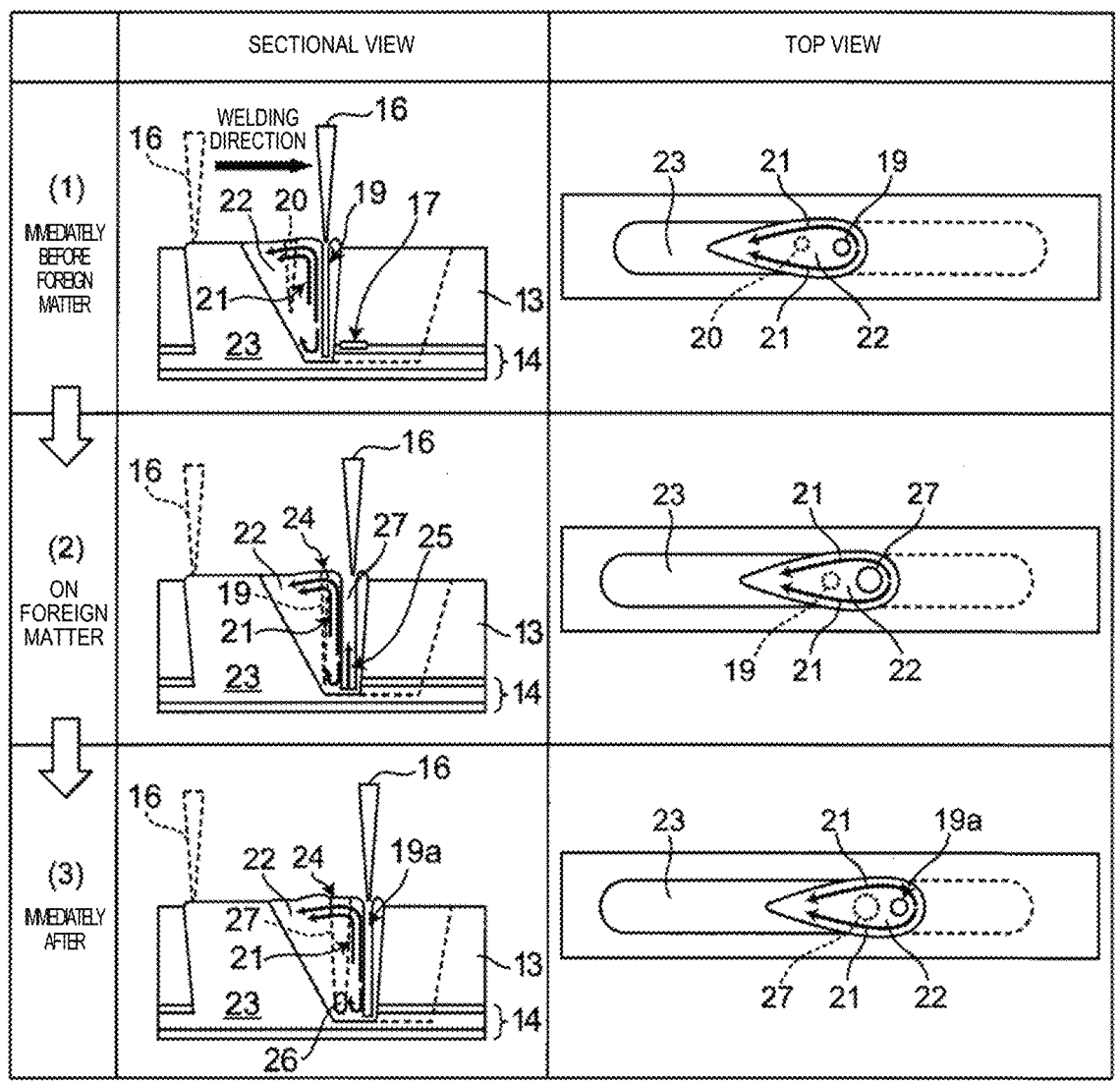
FIG. 14 is a diagram illustrating welding in a case where a resin-based foreign matter interposed between a case bottom portion and a negative electrode tab is located substantially in the center of a welding area.

FIG. 14 is a view illustrating a state of a process of joining battery case bottom portion 13 and negative electrode tab 14 by the keyhole welding in a state where resin-based foreign matter 17 which is interposed between battery case bottom portion 13 and negative electrode tab 14 is positioned at the central portion of the scanning range of laser 16. Process state (1) of FIG. 14 is a sectional view and a top view at the position immediately before resin-based foreign matter 17 during movement of laser 16. Process state (2) of FIG. 14 is a sectional view and a top view at the position on foreign matter 17. Process state (3) of FIG. 14 is a sectional view and a top view at a position immediately after foreign matter 17. Description will be made with these drawings.

First, in process state (1) of FIG. 14, at the position immediately before resin-based foreign matter 17, molten metal flow 21 is generated behind keyhole 19 in the laser welding direction and keyhole 20 generated in the past in time is filled with molten metal flow 21 flowing into keyhole 20 from the front in the welding direction and disappears and gradually cools to form a solidification portion 23. This is a process state of ordinary keyhole welding.

Next, in process state (2) of FIG. 14, when laser 16 arrives at the position on the foreign matter of resin-based foreign matter 17 and is in contact with resin-based foreign matter 17, resin-based foreign matter 17 in contact with laser 16 sublimes rapidly, due to upper pressure 25 by this sublimation, enlarged keyhole 27 in which the inner diameter of keyhole 19 is enlarged is generated. The inner diameter of enlarged keyhole 27 is larger than the inner diameter of keyhole 19 generated at the position (see process state (1) in FIG. 14) immediately before resin-based foreign matter 17.

However, at this time, since the amount of molten metal flow 21 flowing from the front is large, as illustrated in process state (3) of FIG. 14 at the position immediately after passing through resin-based foreign matter 17 and generated enlarged keyhole 27 is filled with molten metal flow 21 flowing from the front to become molten pool 22. However, in a case where the size of resin-based foreign matter 17 is large and all generated enlarged keyhole 27 cannot be completely filled with molten metal flow 21, or in a case where the welding speed is high, since the molten metal flow 21 flowing from the front decreases, there is a case where blow hole 26 remains inside molten pool 22 as illustrated in the diagram of process state (3) immediately after laser 16 is passed through resin-based foreign matter 17 without being filled with molten metal flow 21. In process state (3) of FIG. 14, reference numeral 19a is a keyhole generated immediately after laser 16 is passed through resin-based foreign matter 17.

Figure 15:
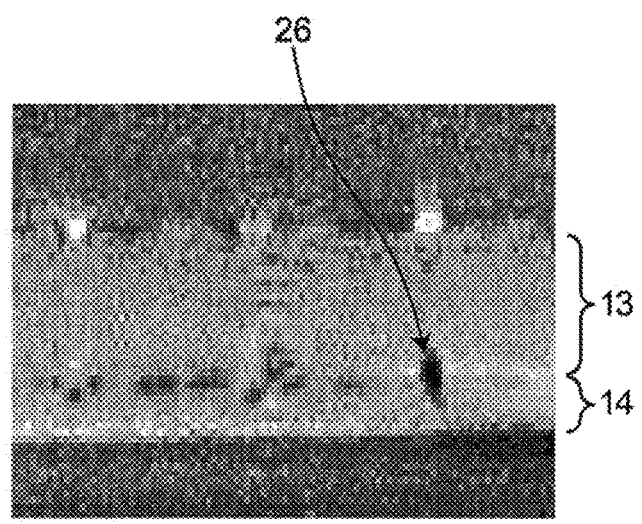
FIG. 15 is a view of a CT image of a blow hole remaining in melting.
Figure 16:
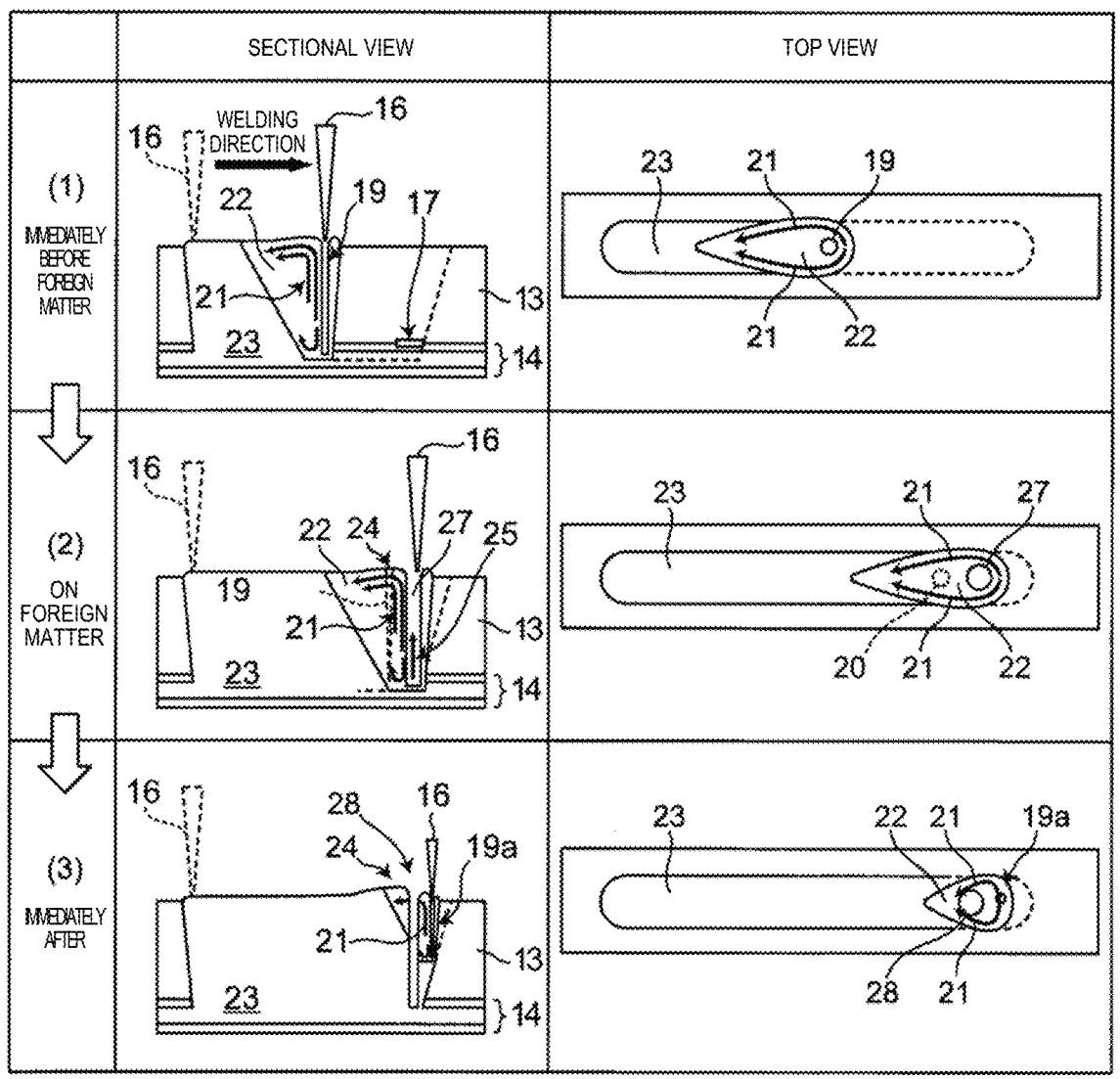
FIG. 16 is a diagram illustrating welding in a case where a resin-based foreign matter interposed between the case bottom portion and the negative electrode tab is located at the laser irradiation termination portion.

FIG. 15 is a computed tomography (CT) image of blow holes 26 remaining in molten pool 22 and blow holes 26 are normally present at the boundary between battery case bottom portion 13 and negative electrode tab 14.

Next, a process state of joining battery case bottom portion 13 and negative electrode tab 14 by keyhole welding is illustrated in FIG. 16 in a case where resin-based foreign matter 17 interposed between battery case bottom portion 13 and negative electrode tab 14 is at the irradiation termination portion of laser 16. Process state (1) of FIG. 16 is a sectional view and a top view at the position immediately before resin-based foreign matter 17 during the movement of laser 16. Process state (2) of FIG. 16 is a sectional view and a top view at the position on foreign matter 17. Process state (3) of FIG. 16 is a sectional view and a top view at the position immediately after foreign matter 17. Description will be made with these drawings.

First, in process state (1) of FIG. 16, in the state of the position immediately before resin-based foreign matter 17, generated keyhole 19 is filled with molten metal flow 21 flowing from the front in the welding direction to the keyhole 19 in the same manner as in the description in (1) of FIG. 14 and thus disappears.

Next, in process state (2) of FIG. 16, when laser 16 arrives at the position on the foreign matter of resin-based foreign matter 17 and is in contact with resin-based foreign matter 17, as in the description in process state (2) of FIG. 14, enlarged keyhole 27 having an inner diameter larger than that of keyhole 19 generated temporarily at the position at process state (1) immediately before of resin-based foreign matter 17 is generated.

However, with respect to the description in FIG. 14, in FIG. 16, the generation portion of enlarged keyhole 27 is at the termination portion of the irradiation of laser 16, and the output of laser 16 gradually decreases. For this reason, since molten metal flow 21 flowing from the front in the welding direction is small compared to the description in process state (3) of FIG. 14, depending on such molten metal flow 21, there is a high possibility that generated enlarged keyhole 27 cannot be filled and the keyhole remains as through-hole 28.

Figure 17:
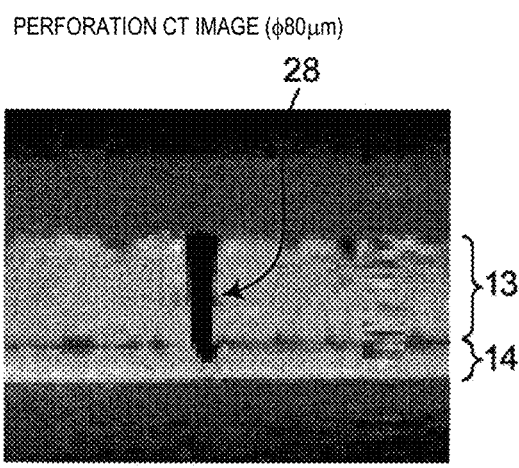
FIG. 17 is a view of a CT image of a through-hole generated at a laser irradiation termination portion.

FIG. 17 is a CT image of through-hole 28 generated at the laser irradiation termination portion. Through-hole 28 is present over battery case bottom portion 13 and negative electrode tab 14.

Figure 18:
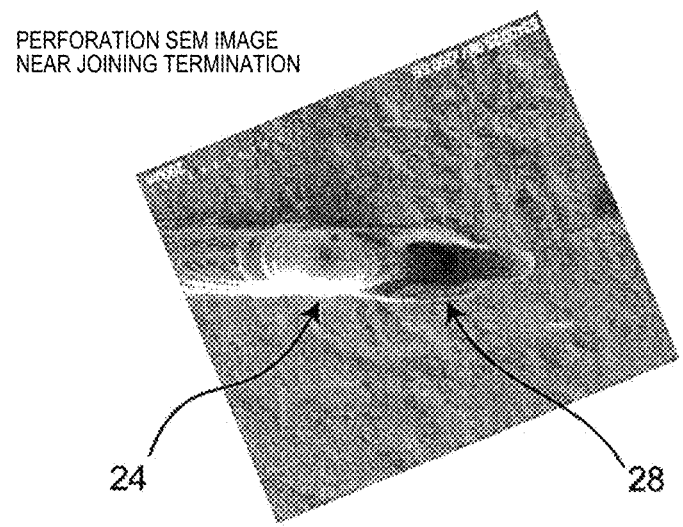
FIG. 18 is a view illustrating a through-hole observed from the battery case bottom portion side.

FIG. 18 is an SEM photograph of through-hole 28 observed from battery case bottom portion 13 side. Melting bulge 24 is formed on the rear side of the generated through-hole 28 in the welding direction by upper pressure 25 when resin-based foreign matter 17 is sublimated.

As described above, in keyhole welding by which battery case bottom portion 13 and negative electrode tab 14 are welded by laser 16 having a beam diameter sufficiently less than the thickness of battery case bottom portion 13 from battery case bottom portion 13 side, there is a high probability that the through-hole 28 is generated at the irradiation termination portion of laser 16. As the reason thereof, at the irradiation termination portion of laser 16, since the amount of molten metal flow 21 flowing from the front in the welding direction is small, generated enlarged keyhole 27 cannot be filled with molten metal flow 21, there is a high probability that the keyhole remains as through-hole 28.

On the other hand, since the area of the joining portion between battery case bottom portion 13 and negative electrode tab 14 is a parameter for determining a joining strength between battery case bottom portion 13 and negative electrode tab 14, so as to ensure a certain joining strength or more, an area of a joining portion of a predetermined amount or more is required.

A method of setting the welding conditions for securing the joining strength between battery case bottom portion 13 and negative electrode tab 14 by a predetermined amount or more will be described with reference to FIG. 19A to FIG. 22.

Figure 19A:
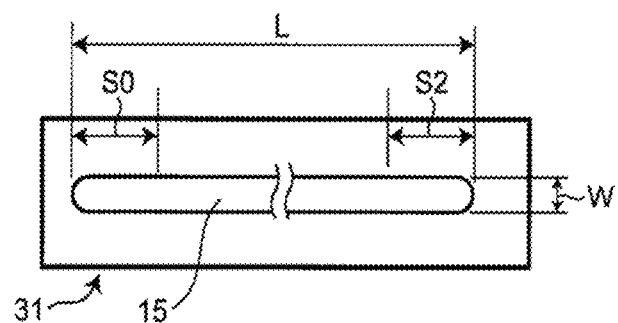
FIG. 19A and FIG. 19B are a top view and a sectional view, respectively, in a case where the case bottom portion and the negative electrode tab are welded to joining portion length S1.
Figure 19B:
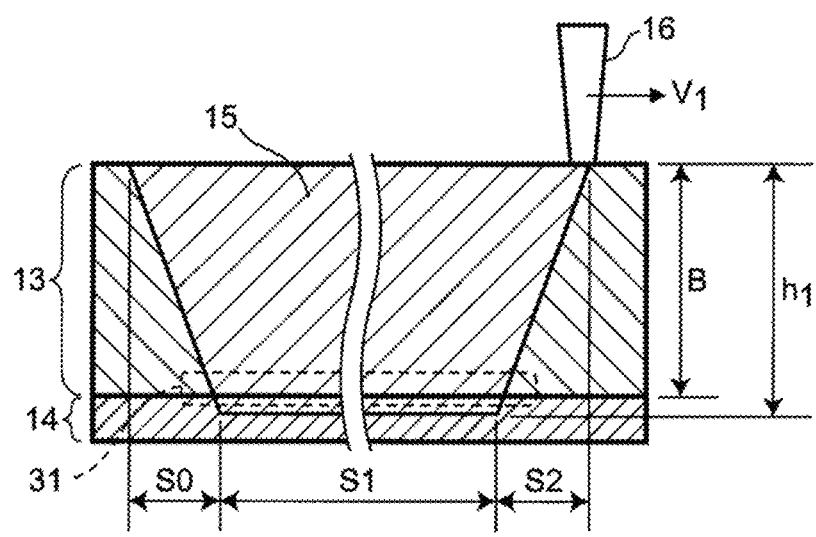

FIG. 19A and FIG. 19B are a top plan view and sectional view, respectively, as viewed from battery case bottom portion 13 side in a case of welding at joining portion 31 between battery case bottom portion 13 and negative electrode tab 14 in the scanning direction length S1 of laser 16. In a case where battery case bottom portion 13 and negative electrode tab 14 are joined to each other, depth h1 of welded portion 15, which is a linear welding trace, always has a relationship h1>B with respect to thickness B of battery case bottom portion 13. In FIG. 19A and FIG. 19B, welding starts from the left side and welding proceeds toward the right side. The scanning speed of laser 16 at this time is set to fixed speed $V_1$. In addition, in the top view of 19A, when it is assumed that the length of the outer appearance of welded portion 15 is L and the width thereof is W, length L thereof is determined by the scanning distance of laser 16, and width W thereof is determined by a beam diameter of laser 16 and the scanning speed of laser 16. In other words, when scanning speed $V_1$ of laser 16 is slow, width W is usually larger than the beam diameter of laser 16 due to the melting of the metal due to heat conduction to the surroundings.

In the welding start portion of laser 16, that is, in the section of length S0 of the joining portion, the output of the laser continuously and gradually increase to increase the penetration depth so as to suppress the generation of spatter. This is also the method described also in Japanese Patent No. 4647707, so as to prevent spatter from scattering to the surroundings. When energy is suddenly injected into a metal, phase transformation of solid→melting→fluid becomes unstable, and many spatters are generated. The depth of welded portion 15 of the joining portion is maintained at h1. On the other hand, in the welding termination portion of laser 16, that is, in the section of length S2 of the joining portion, the output of the laser continuously and gradually decreases, and the penetration depth decreases so as to fill the keyhole generated during welding. The length in the scanning direction of laser 16 in the cross section of the welded portion where the laser output continuously and gradually decreases at the weld termination portion is set to S2.

Figure 20:
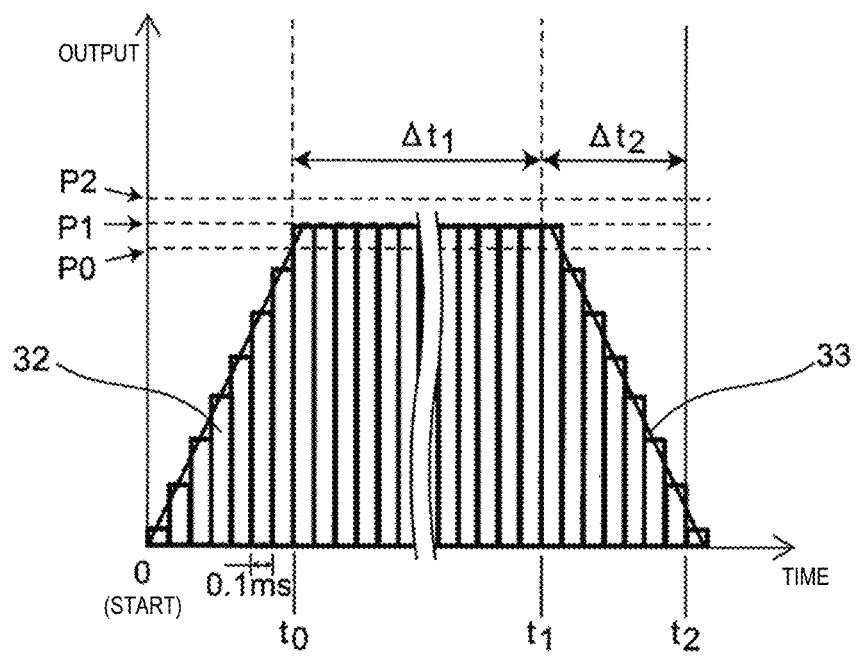
FIG. 20 is a diagram illustrating laser output control with respect to elapsed time in FIG. 19A and FIG. 19B.

FIG. 20 is a diagram illustrating the laser output control with respect to the elapsed time from the welding start when welded portion 15 of FIG. 19A and FIG. 19B is formed. The horizontal axis represents the time from oscillating the laser and the vertical axis represents the laser output at the processing point at each time.

Although the time resolution of the laser output control depends on the apparatus controlling a laser oscillator, the time resolution thereof is at least about 0.1 ms. The hollow rectangle 32 in FIG. 20 is the laser output set value of the processing point at each elapsed time.

From the welding start, case bottom portion 13 and negative electrode tab 14 are joined together with the laser output gradually raised to the output P1 or more. At output P2 or more, since laser 16 passes through negative electrode tab 14, the output is set between P1 and P2. At time $t_0$, the output which is equal to or more than output P1 and is maintained only for time $\Delta t_1$ to secure the length S1 of the joining portion. At the laser welding termination portion, the laser output is continuously and gradually lowered continuously at time $t_1$, and the laser output becomes zero at time $t_2$ after the elapse of time $\Delta t_2$ and the welding is completed.

Figure 21A:
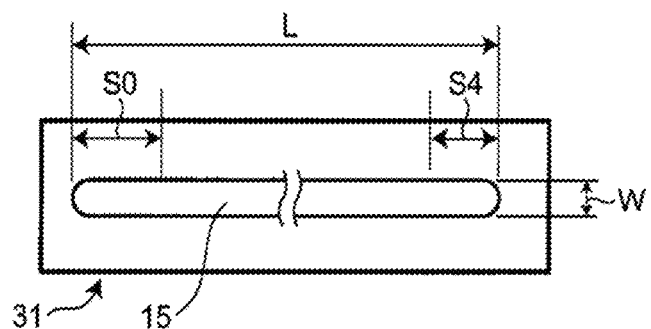
FIG. 21A and FIG. 21B are a top view and a sectional view, respectively, in a case where the battery case bottom portion and the negative electrode tab are welded to a joining portion length S2.

Next, a method of setting welding conditions for increasing welding strength between battery case bottom portion 13 and negative electrode tab 14 at scanning speed $V_1$ of laser 16 without changing weld outer appearance length L on battery case bottom portion 13 side is described with reference to FIG. 21A to FIG. 22.

Similarly, from the welding start, the laser output continuously and gradually increase and case bottom portion 13 and negative electrode tab 14 are joined to each other at output P1 or more. Time $t_0$ until the laser output increases to be equal to or greater than output P1 is a necessary time for suppressing the generated spatter. Time $\Delta t_3$ (=second period TP2) is maintained at a fixed value equal to or greater than output P1 to secure length S3 (>S1) of the joining portion. At the laser welding termination portion, the laser output gradually decreases at time $t_3$, the laser output becomes zero at time $t_4$ after the elapse of time $\Delta t_3$ and the welding are completed. However, length S4 of the cross section of the welded portion where the laser output continuously and gradually decreases at the welding termination portion is shorter than length S2. Therefore, in a case where enlarged keyhole 27 is generated by resin-based foreign matter 17 at the irradiation termination portion of laser 16, the amount of molten metal flow 21 to fill enlarged keyhole 27 decreases, and the possibility of through-hole 28 being generated further increases.

Figure 23:
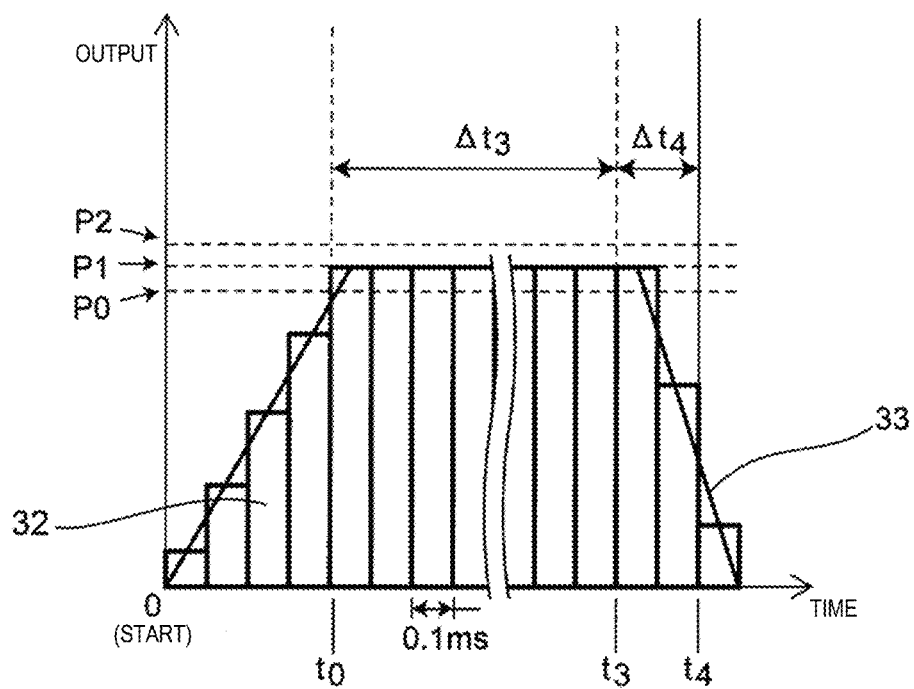
FIG. 23 is a diagram illustrating output control with respect to elapsed time in a case where the laser scanning speed is doubled as that in the related art.

In addition, in a case where scanning speed $V_1$ of laser 16 is set to speed $V_2$ which is twice scanning speed $V_1$, since the time resolution of the laser output control is not changed to 0.1 ms, the set resolution of the output of the welding termination portion becomes coarse as illustrated in FIG. 23 and the area of the cross section of the welded portion where the output of the laser gradually continuously and decreases further decreases and in a case where enlarged keyhole 27 is generated by resin-based foreign matter 17 at the irradiation termination portion of laser 16, the amount of the molten metal flow 21 for filling enlarged keyhole 27 decreases and the possibility of the generation of through-hole 28 further increases.

Since the present disclosure is intended to solve the problem of the related art described above, in the case where enlarged keyhole 27 is generated by a resin-based foreign matter at the irradiation termination portion of laser 16, since the amount of the molten metal flow for filling enlarged keyhole 27 increases, an object thereof is to suppress the possibility of generation of the through-hole 28 formed in the irradiation termination portion of laser 16 due to the interposition of resin-based foreign matter by a welded structure such as a battery and a manufacturing method thereof.

Embodiment 1

Figure 2:
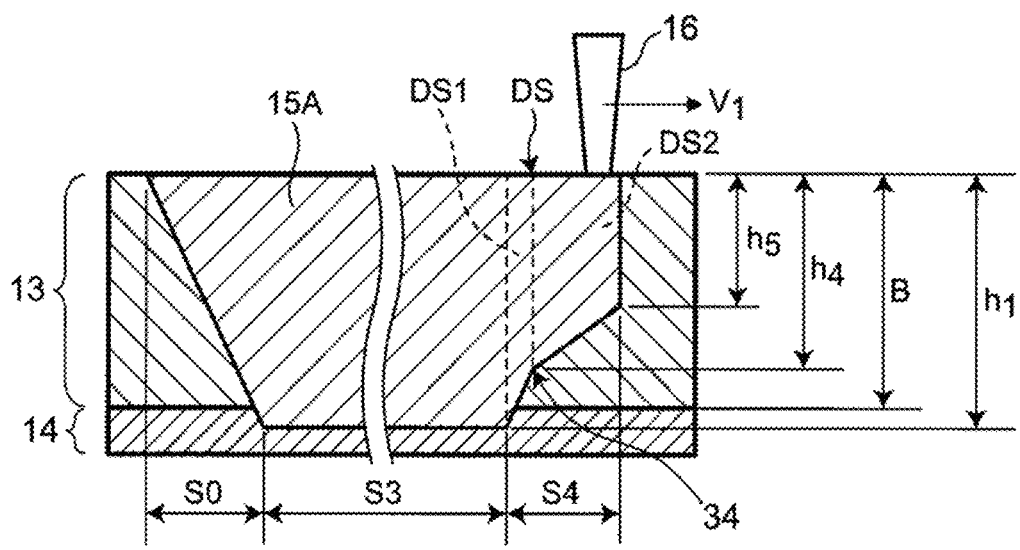
FIG. 2 is a view illustrating a cross section of a welded portion according to Embodiment 1.

FIG. 2 illustrates a sectional structure of a welded portion between battery case bottom portion 13 and negative electrode tab 14 of a cylindrical battery as an example of a welded structure according to Embodiment 1. In this battery, battery case bottom portion 13 and negative electrode tab 14 are joined to each other at welded portion 15A so that the inner surface of battery case bottom portion 13 is in close contact with negative electrode tab (example of electrode tab) 14. Welded portion 15A is continuously formed so as to extend from the outer surface of battery case bottom portion 13 to the inside of negative electrode tab 14. In addition, so as to realize a sectional structure of welded portion 15A of a linear welding trace between battery case bottom portion 13 and negative electrode tab 14 of the cylindrical battery according to Embodiment 1, FIG. 1 is a diagram illustrating laser output control with respect to the elapsed time form the welding start. In FIG. 1, when the time resolution of laser output control is set to 0.1 ms, hollow rectangle 32 is an integral value of the laser output at the processing point at each time. In addition, black line 33 is a line connecting the average values of laser outputs at each time. In the drawing, time $t_0$ and the like are set to the start time (left end of rectangle 32) of the laser output change command and period TP1 or the like and time $\Delta t_3$ or the like are described below with reference to the average value of the laser output (black line 33).

In FIG. 2, the material of battery case bottom portion 13 is made of, for example, iron or SUS. As an example, in a case where battery case bottom portion 13 is made of iron, nickel having a thickness of several microns is coated on the surface by plating or the like so as to prevent corrosion thereof. Negative electrode tab 14 has a unitary nickel or a laminated structure of a nickel layer/a copper layer/a nickel layer, for example.

During laser welding, from the side of negative electrode tab 14, negative electrode tab 14 is pressed against battery case bottom portion 13 by a heat-resistant rod-like jig and from the side of the laser irradiation direction, a portion other than the laser irradiation portion is pressed by a jig or the like, and battery case bottom portion 13 and negative electrode tab 14 are laser-welded while being in close contact with each other.

In the laser welding method which is an example of the manufacturing method of the welded structure, a linear welding trace is formed by relative movement between the laser and bottom portion 13 of the battery case.

Specifically, this laser welding method includes at least the following:

(a) First, during first period TP1 from the start of the laser irradiation until time $t_0$, the output of the laser increases to first output P1, and battery case bottom portion 13 is melted at first output P1 until electrode tab 14 is melted.

(b) After that, that is, after first period TP1, during second period TP2, first output P1 is maintained to melt electrode tab 14 and battery case bottom portion 13.

(c) After that, that is, after second period TP2, the output of the laser decreases from first output P1 to second output P4 which melts only battery case bottom portion 13.

(d) After that, second output P4 is maintained until the formation of the welding trace is completed (see Embodiment 2 described below) or the laser output is decreased from the second output P4 by an amount that is less than the decrease amount when the laser output decreased from the first output P1 to the second output P4.

Performance of (c) and (d) above occur during time period $\Delta t_4$ which is third period TP3, and the output of the laser does not decrease to zero until the formation of the welding trace is completed.

More specifically, the process is performed as follows.

When laser 16 is scanned at fixed speed $V_1$ by a scanner such as a galvano mirror with respect to the battery or when the laser is scanned at a fixed speed by movement of a stage holding the battery case or the like, in FIG. 1, the laser output continuously and gradually increases to laser output (an example of first output) P1 for joining battery case bottom portion 13 and negative electrode tab 14 only in first period TP1 from the laser irradiation start until time $t_0$, at first output P1, battery case bottom portion 13 is melted until negative electrode tab 14 is melted. First output P1 is an output for melting negative electrode tab 14 and melting battery case bottom portion 13.

Here, in FIG. 2, the penetration depth at this laser output P1 is set to h1. In Embodiment 1, first period TP1 and first section distance S0 from the laser irradiation start to time $t_0$ are referred to as an upslope. Laser output P0 is a critical output at which battery case bottom portion 13 and negative electrode tab 14 are welded together and laser output P2 is an output through which laser 16 penetrates negative electrode tab 14 and the relationship between laser outputs P0, P1, and P2 is always P0<P1<P2.

For example, if battery case bottom portion 13 is 0.3 mm thick SUS with Ni plating of several μm thick, and negative electrode tab 14 is a laminated structure having a nickel layer/copper layer/nickel layer=25 μm/50 μm/25 μm, time $t_0$ is normally required for first period TP1=0.5 ms, and in a case where the fixed speed is $V_1$=200 mm/s, the first section distance S0=0.1 mm. As an example, when laser output P1 (first output) is 800 to 850 W, the penetration depth is h1=0.34 to 0.35 mm. Here, first output P1 is an output that welds battery case bottom portion 13 and negative electrode tab 14 and is not less than half the thickness of negative electrode tab 14 and does not penetrate the tab thickness and can be 800 to 850 W, for example.

In FIG. 1, since the laser output control has a time resolution of 0.1 ms, the laser output rises step by step. If first period TP1, that is, time $t_0$ is too short, for example, for upslope time $t_0$ of about 0.2 ms or less with respect to a SUS having a thickness of 0.3 mm and plated with Ni of the thickness described above of several μm, the laser irradiated SUS rapidly rises in temperature to be in a molten state, and many spatters are generated due to the reaction force due to the rapid temperature rise.

If many spatters are generated, the optical components for condensing laser 16 are soiled, the laser is shielded due to the contamination, the output of the laser is weakened, the welding failure is generated, the spatter enters the battery case, and thus this causes a short circuit failure when using the battery, which causes a secondary failure. Therefore, so as to suppress scattering of spatter to the surroundings, it is desirable to secure the upslope time $t_0$ described above, that is, first period TP1 for 0.5 ms or more, and continuously increase the laser output.

Next, in FIG. 1, after the laser output reaches first output P1, the laser output is maintained constant at first output P1 during second period TP2=$\Delta t_3$ time, and negative electrode tab 14 and battery case bottom portion 13 are melted. The welding length at this time is S3 and as welding length S3 is longer, the joining strength between battery case bottom portion 13 and negative electrode tab 14 becomes stronger.

For example, in a case where the torque strength between battery case bottom portion 13 and negative electrode tab 14 is 10 N·m or more, if junction length S3 is S3=2 mm and fixed speed $V_1$ is $V_1$=200 mm/s, second period TP2=$\Delta t_3$=10 ms.

Next, in FIG. 1, during time period $\Delta t_4$ as third period TP3 after time $t_3$ from the laser irradiation start (that is, after the elapse of first period TP1 and second period TP2), the laser output decreases from laser output P1. Time $\Delta t_4$ from laser output P1 to time $t_4$ when the laser output gradually decreases to laser output P5 after the laser output becomes the laser output (example of second output) P4=the third period TP3 and the third section distance S4 is referred to as a downslope portion DS in Embodiment 1. In the welding method described in Japanese Patent No. 4647707 of the related art, the laser output merely continuously decreases. In Embodiment 1, on the other hand, during third period TP3=time $\Delta t_4$ after time $t_3$ of laser output P1, the laser output gradually decreases from laser output P1 to the laser output (example of second output) P4 which is 50 to 97% of laser output P0 which is the critical output by which battery case bottom portion 13 and negative electrode tab 14 are welded. Thereafter, during remaining time $\Delta t_4$, laser output P4 gradually decreases from laser output P4 to laser output P5, and laser output P5 lower than laser output P4 is maintained until the termination of the laser irradiation portion and processing is performed. Laser output P5 is set to 20 to 50% of laser output P0 so as to achieve the desired effect. Therefore, during third period TP3=time $\Delta t_4$, the laser output becomes laser output P5 from laser output P1 via laser output (example of second output) P4. Second output P4 is an output for melting only battery case bottom portion 13. In other words, when the variation in the laser output is about ±3%, at the time when the formation of the welding trace is completed, at least 0.97 times of laser output P0 which is a critical output for welding battery case bottom portion 13 and negative electrode tab 14 may remain.

In addition, as the minimum time of time $\Delta t_4$, $h_{5min}$=DS2−V$_{28}$=B/2S4×($\pi$×W−2S4).

From this equation, S4=$\pi$WB/2/($h_{5min}$+B).

Here, when the scanning speed of the laser is $V_1$, $\Delta t_{4\_min}$=S4/$V_1$.

As actual values, if W=0.05 mm, B=0.3 mm, $h_{5\_min}$=0.2 mm, S4=0.04712389 mm, $V_1$=200 mm/s, $\Delta t_{4\_min}$=0.000235619 s=0.235619449 ms when assuming $\pi$=3.141592654.

Therefore, the minimum time of time $\Delta t_4$ is 0.2 ms, and third period TP3=$\Delta t_4$=0.2 ms. The weld outer appearance length L is L=S0+S3+S4=0.1 mm+2 mm+0.04 mm=2.14 mm.

Figure 21B:
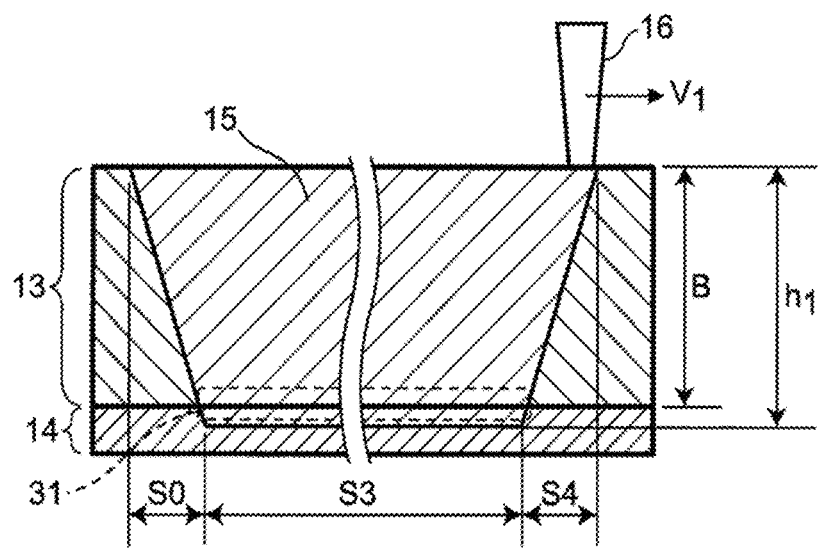
Figure 22:
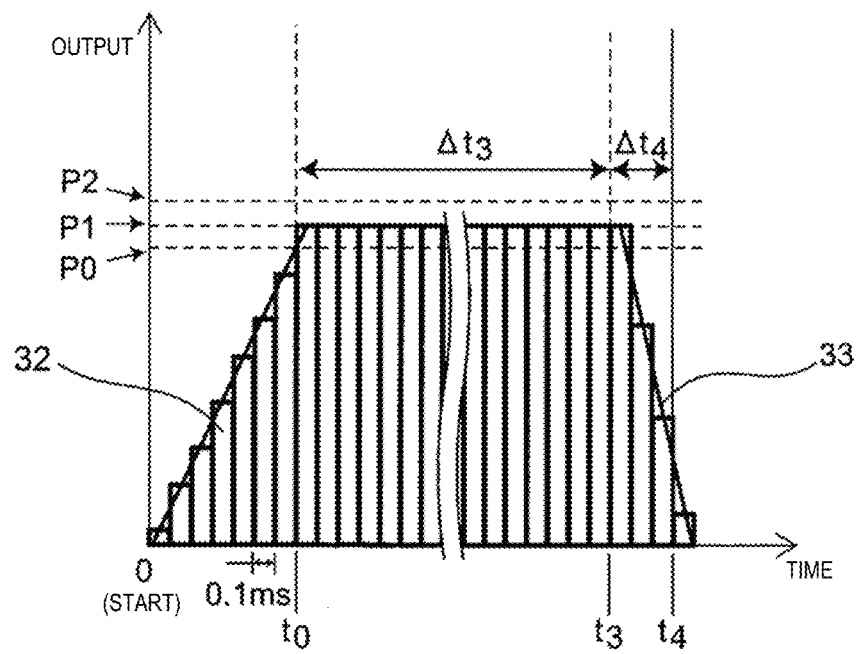
FIG. 22 is a diagram illustrating laser output control with respect to elapsed time in FIG. 21A and FIG. 21B.

Under this condition, inflection point 34 which is not in the related art of FIG. 21 is formed in the cross section of downslope portion DS in FIG. 2.

Figure 3:
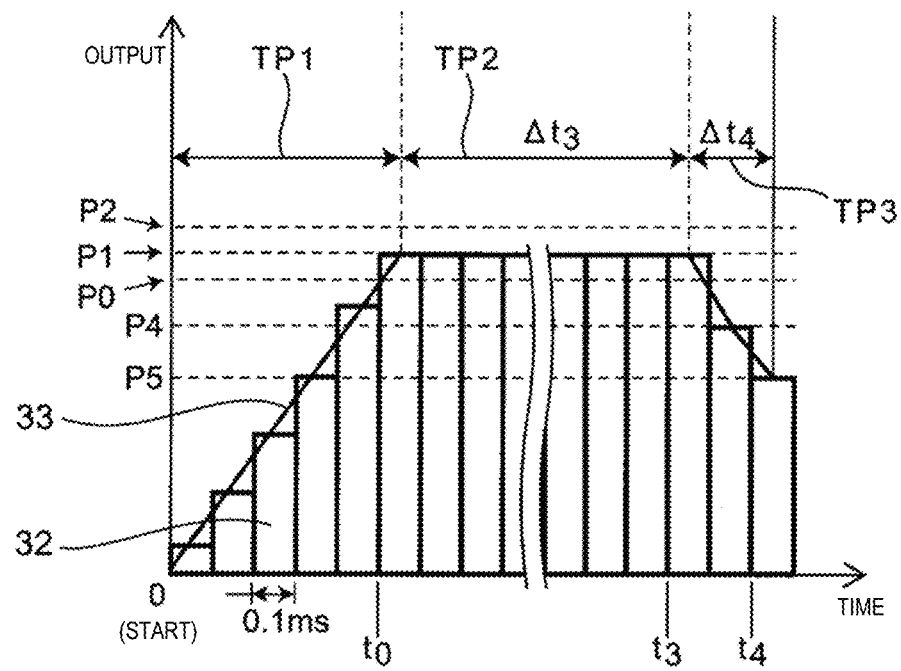
FIG. 3 is a diagram illustrating laser output control with respect to elapsed time according to Embodiment 1.
Figure 4:
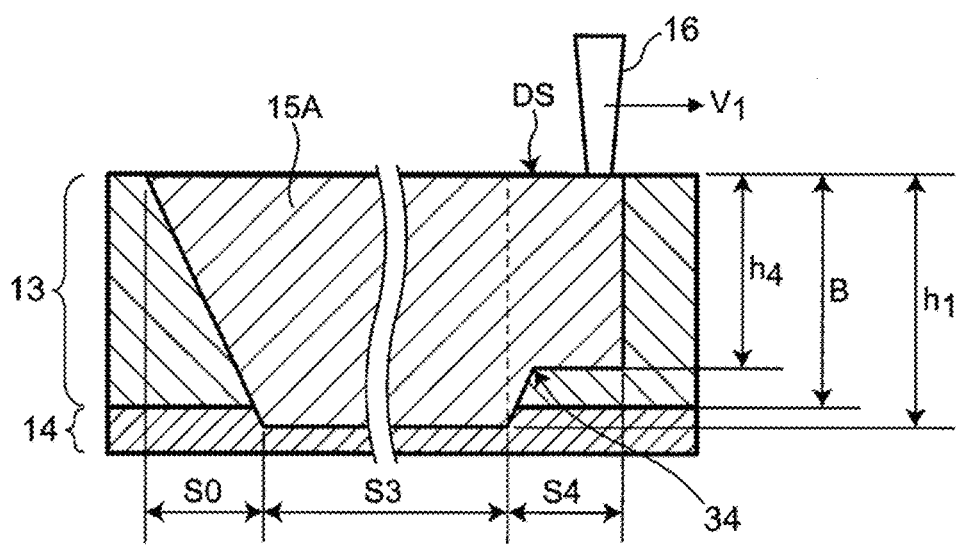
FIG. 4 is a view illustrating a sectional area of a downslope portion formed by a manufacturing method of a welded structure of Embodiment 1.

Here, as the sectional area of downslope portion DS increases, the amount of the molten metal flow 21 (that is, amount of molten pool) filling through-hole 28 described in FIG. 16 to FIG. 18 increases and depth h4=h5, that is, when the laser output is 50% of P4=P5=P0, the hole filling effect of through-hole 28 is maximized. In other words, according to the profile of the laser output control illustrated in FIG. 3, the laser is scanned until the output becomes the laser output 0→P0→P1→P4 and then laser output P5 of laser output P4 or less keeps as it is until the termination of the laser irradiation portion keeps and performs processing. Accordingly, as illustrated in FIG. 4, it is possible to form downslope portion DS having a higher hole filling effect of through-hole 28.

h4 is the depth of inflection point 34 and h5 is the penetration depth at the termination point of welded portion 15A. A region formed up to laser output P4 (inflection point 34) is referred to as first downslope portion DS1, a region from inflection point 34 to the termination point of welded portion 15A is referred to as second downslope portion DS2. In other words, welded portion 15A has first downslope portion DS1 and second downslope portion DS2 located on the outside portion of first downslope portion DS1 in a side portion region of welded portion 15A in the cross section in the thickness direction of negative electrode tab 14. First downslope portion DS1 is present across both regions of negative electrode tab 14 and battery case bottom portion 13 and thickness thereof gradually becomes thinner toward the outside. Second downslope portion DS2 is present only in the region inside battery case bottom portion 13 and the amount of change in thickness thereof is less than that in first downslope portion DS1.

Finally, in FIG. 1, the laser output is stopped after time $t_4$ from the laser irradiation start (that is, after first period TP1, second period TP2, and third period TP3 elapse), welding between battery case bottom portion 13 and negative electrode tab 14 of Embodiment 1 is completed.

Figure 5:
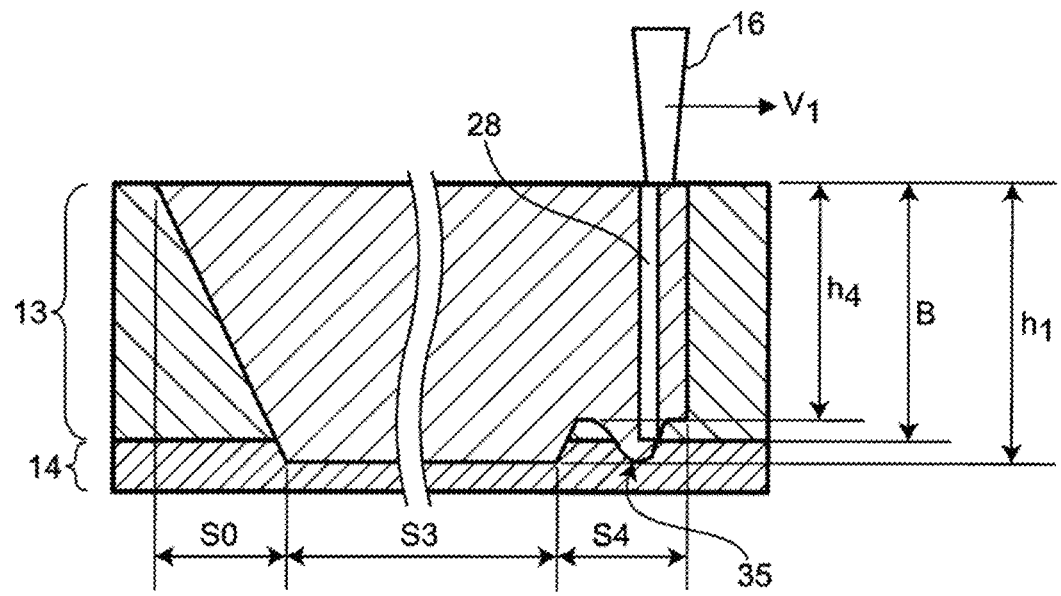
FIG. 5 is a view illustrating the generation of a through-hole in a case where there is a new joining portion between a battery case bottom portion and a negative electrode tab formed in the downslope portion due to variations in a laser output.

Here, the thickness of second downslope portion, that is, penetration depth h4, is at most 97%, (second output P4=770 to 820 W) with respect to thickness B of battery case bottom portion 13, for example, when B=0.3 mm, it is preferable that the depth of inflection point 34 be the maximum h4=0.29 mm, and in a case where penetration depth h4 is small (less than 50% of thickness B) the amount of molten metal flow 21 for filling through-hole 28 opened in battery case bottom portion 13 is small and the hole filling effect is small. In addition, in a case where penetration depth h4 is too close to thickness B of battery case bottom portion 13 (more than 97% of thickness B), due to material thickness variation, laser output variation, or the like, there is a high possibility that a new hole is generated through which through battery case bottom portion 13 is penetrated in section S4 of the downslope portion, interposed between battery case bottom portion 13 and negative electrode tab 14 between the downslope portions, and be in contact with another resin foreign matter or the like. FIG. 5 is a view illustrating generation of through-hole 28 in a case where there is a new joining portion 35 between battery case bottom portion 13 and negative electrode tab 14 formed in the downslope portion due to variations in the laser output. So as to prevent such new joining portion 35 and through-hole 28 from remaining, inflection point 34 is disposed in battery case bottom portion 13, and the thickness of second downslope portion DS2, that is, a distance from a surface of inflection point 34 is set to 50% or more of thickness B of battery case bottom portion 13 and 97% or less of thickness B. Here, second output P4 is an output of −3% to −5% of the output that can penetrate battery case bottom portion 13, and can be set to 770 W to 820 W as an example.

As described above, according to Embodiment 1, after the laser output decreases from first output P1 to second output P4 that melts only battery case bottom portion 13 at the irradiation termination portion of laser 16, the decrease amount of the laser output from second output P4 is made smaller than the decrease amount when the output decreases from first output P1 to second output P4. Accordingly, even if a melting amount (amount of molten metal flow) at the laser termination portion increases and the resin-based foreign matter is interposed at the interface between battery case bottom portion 13 and negative electrode tab 14 to generate through-holes, it is possible to fill the through-holes and suppress generation of holes with a large melting amount. Therefore, for example, in a case where enlarged keyhole 27 is generated by the resin-based foreign matter at the irradiation termination portion of laser 16, enlarged keyhole 27 can be sufficiently filled with a large melting amount. As a result, it is possible to suppress the generation of through-hole 28 even if a resin-based foreign matter is interposed at the interface between battery case bottom portion 13 and negative electrode tab 14, and thus a welded structure and a manufacturing method thereof can be provided with high reliability.

Embodiment 2

Embodiment 2 is a method of further increasing the molten pool amount (amount of molten metal flow) of downslope portion DS than in Embodiment 1.

Figure 6:
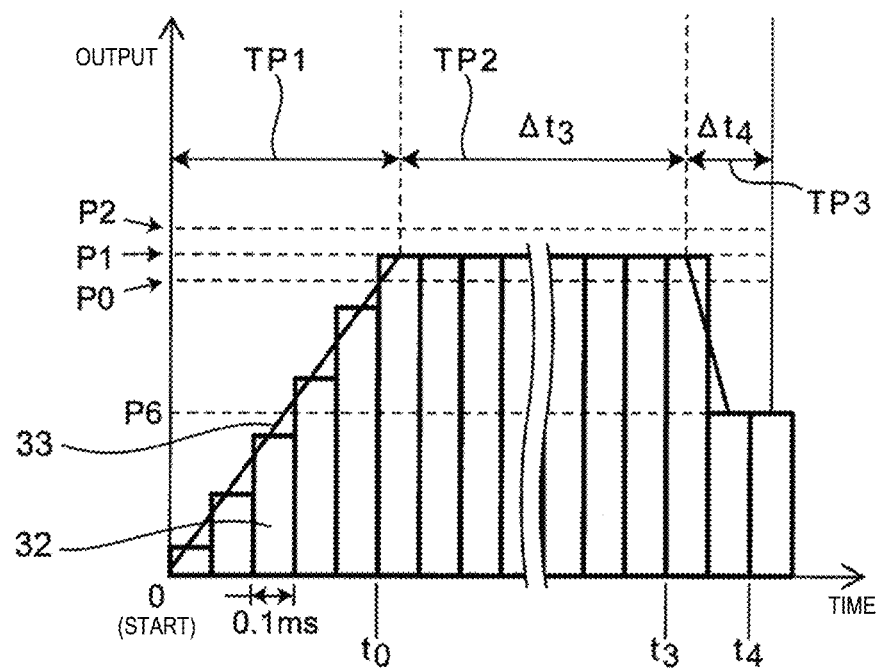
FIG. 6 is a diagram illustrating the laser output control and the laser scanning speed with respect to elapsed time according to Embodiment 2.
Figure 7A:
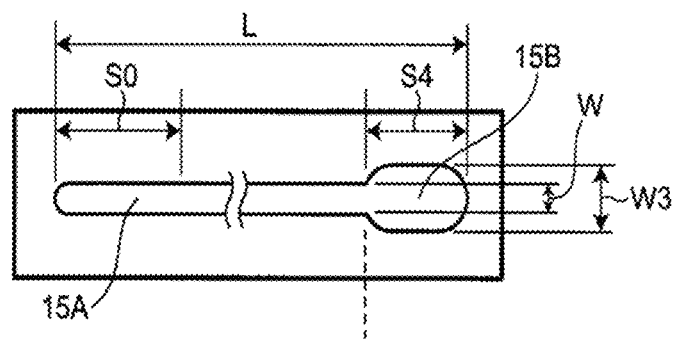
FIG. 7A and FIG. 7B are views illustrating an upper surface and a cross section, respectively, of a welded portion according to Embodiment 2.
Figure 7B:
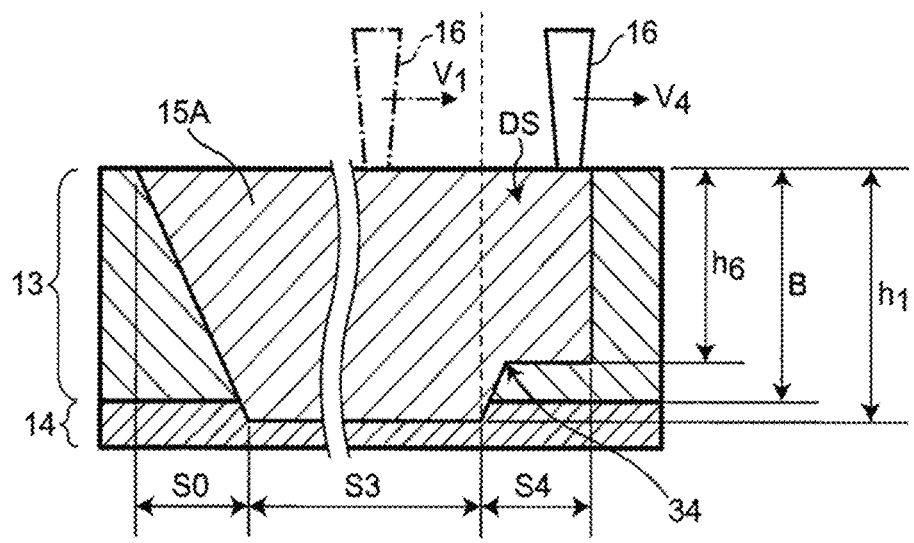
Figure 8:
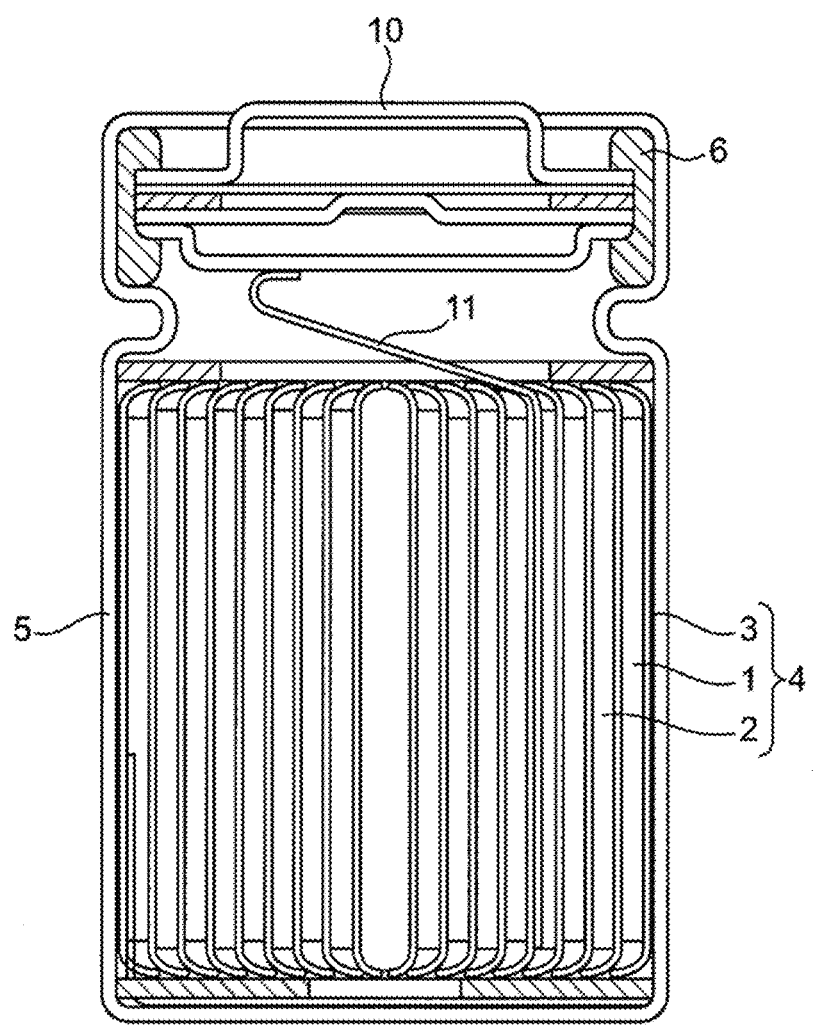
FIG. 8 is a sectional view schematically illustrating a configuration of a sealed secondary battery.
Figure 9:
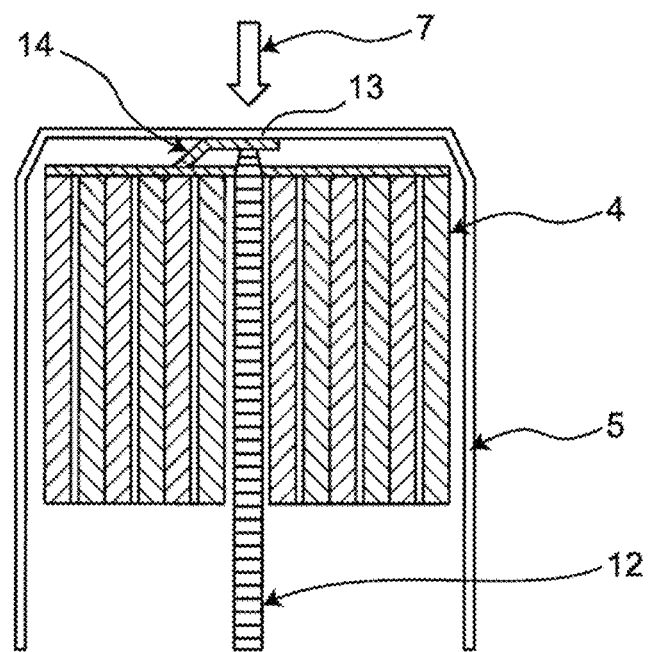
FIG. 9 is a view illustrating a welding method between a battery case and a negative electrode tab of the related art described in Japanese Patent Unexamined Publication No. 2004-158318.
Figure 10:
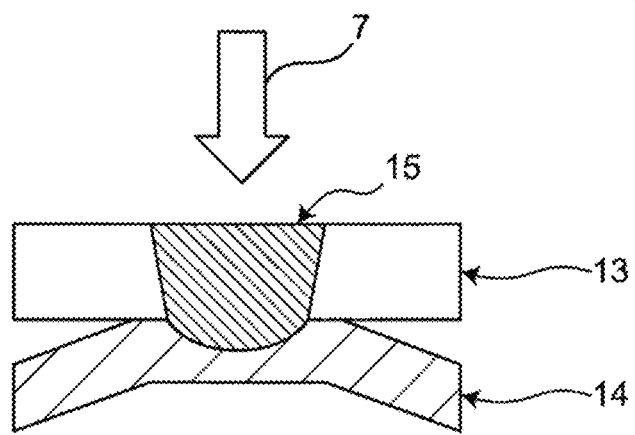
FIG. 10 is an enlarged sectional view of a welded portion of a battery case and a negative electrode tab of the related art described in Japanese Patent Unexamined Publication No. 2004-158318.
Figure 11:
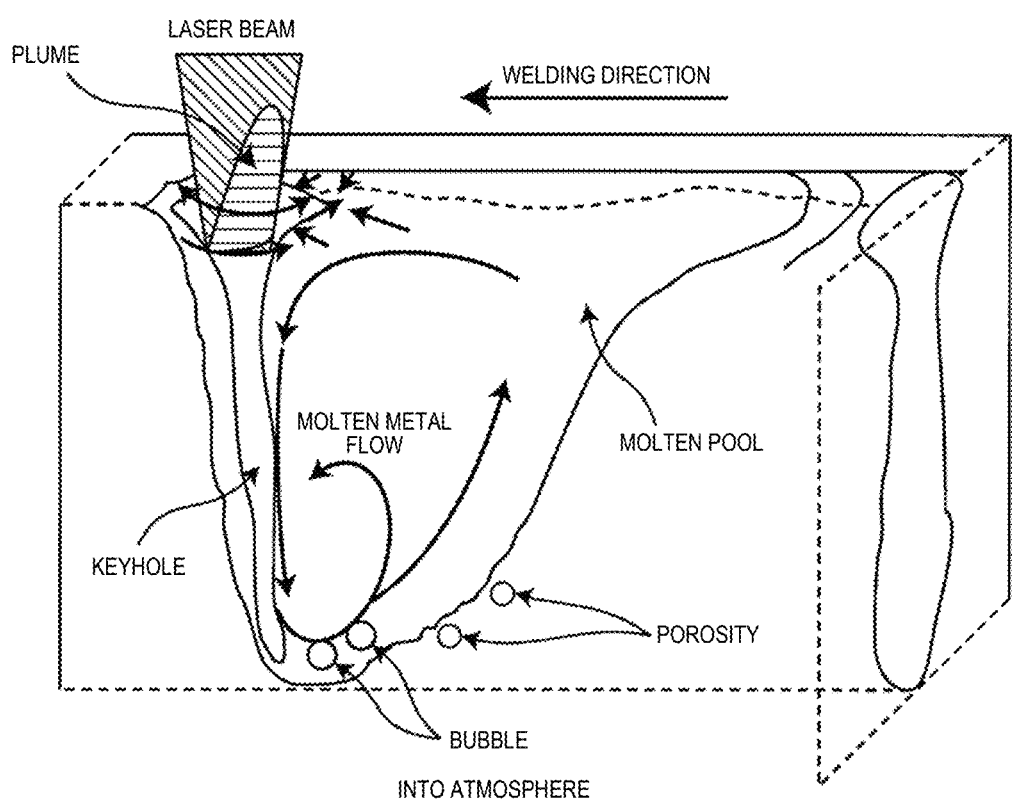
FIG. 11 is a diagram illustrating keyhole welding.
Figure 12:
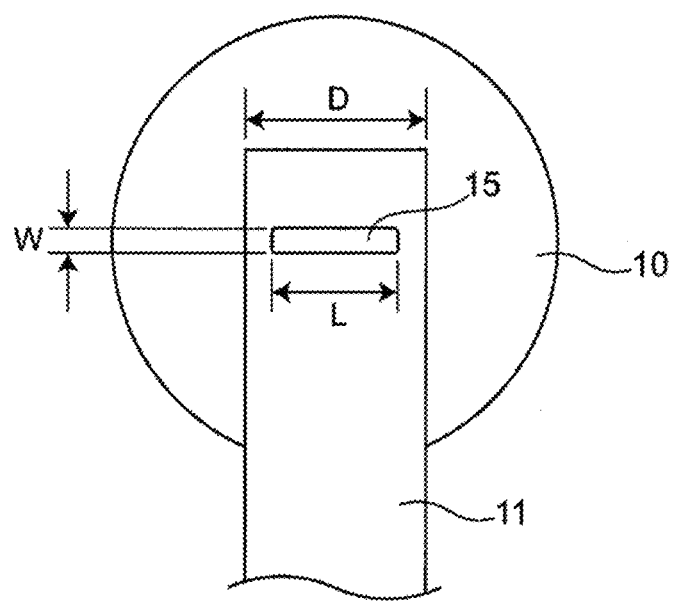
FIG. 12 is a view illustrating a welding method of a sealing plate and a positive electrode tab of the related art described in Japanese Patent No. 4647707.
Figure 13:
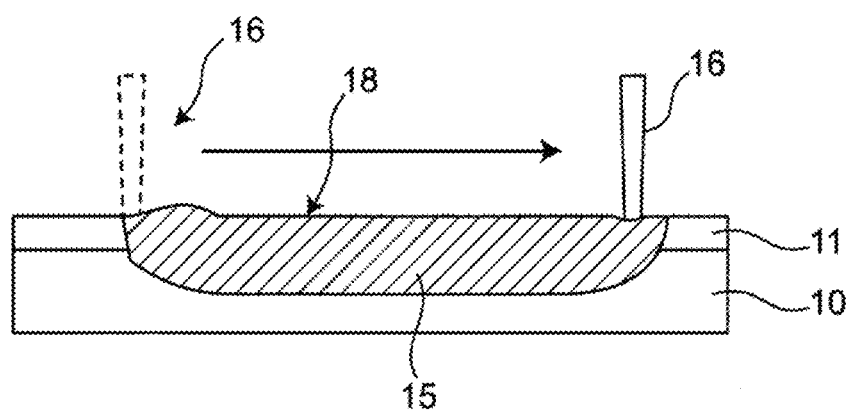
FIG. 13 is an enlarged sectional view of a welded portion of a sealing plate and a positive electrode tab of the related art described in Japanese Patent No. 4647707.

FIG. 7A and FIG. 7B are a top view and a sectional side view, respectively, illustrating a sectional structure of the welded portion as viewed from battery case bottom portion 13 side (outer surface side) of battery case bottom portion 13 and negative electrode tab 14 of the cylindrical battery according to Embodiment 2 of the present invention. In addition, FIG. 6 is a welding method for realizing a welded sectional structure of battery case bottom portion 13 and negative electrode tab 14 of the cylindrical battery according to Embodiment 2 of the present invention and FIG. 6 illustrates the horizontal axis representing the elapsed time from the welding start and the vertical axis representing the set value of the laser output. The set resolution of the laser output is 0.1 ms.

In FIG. 7, as in Embodiment 1, when laser 16 is scanned with a scanner such as a galvano mirror with respect to the battery at fixed speed $V_1$, or when the stage or the like holding the battery case moves, and thus laser 16 scans the battery at a fixed speed $V_1$, the output of the laser continuously increases only in the first period TP1 from the laser irradiation start until time $t_0$ and battery case bottom portion 13 is melted until negative electrode tab 14 is melted at first output P1.

Next, after the laser output reaches joining output between battery case bottom portion 13 and negative electrode tab 14, that is, first output P1 during time $\Delta t_3$ from time $t_0$ to time $t_3$ (that is, during second period TP2), the laser output is maintained at fixed first output P1 to melt negative electrode tab 14 and battery case bottom portion 13.

Next, during period $\Delta t_4$ (that is, during third period TP3) after time $t_3$ (that is, after elapse of first period TP1 and second period TP2), the laser output decreases from laser output P1 to laser output P6 and also decreases the scanning speed of the laser from the scanning speed $V_1$ to scanning speed $V_4$. As the scanning speed becomes slower, the amount of molten metal flow can increase by heat conduction to the surroundings. Here, laser output P6 is P1>P0>P6>0, $P6_{max}$=P0×0.97 (because laser output variation is ±3%), and P6 min=P5 min. In addition, scanning speed $V_4$ is $V_1$>$V_4$>0. By combining the laser output and the laser scanning speed, as illustrated in the plan view of the welded portion of FIG. 7, laser irradiation portion termination 15B is thicker than outer appearance width W of the normal (central portion of welded portion 15A) and can be width W3 so that the amount of the molten metal flow in the downslope portion further increases and the effect of filling the generated through-hole 28 increases. The portion of laser irradiation portion termination 15B corresponding to second downslope portion DS2 excluding the curved terminal edge portion has fixed width W3 irrespective of the place thereof.

Outer appearance width W3 of laser irradiation portion termination 15B, that is, outer appearance width W3 of the welded portion corresponding to downslope portion DS on the outer surface of battery case bottom portion 13 can be expressed by the following equation using laser output P6, scanning speed $V_4$, and proportionality constant k6.

$$W3=k6\times P6/V_4$$

Proportionality constant k6 is a constant depending on the heat conductivity of the material.

On the other hand, penetration depth h6 of downslope portion DS can be similarly expressed by the following equation.

$$h6=S6\times P6/V_4$$

Proportionality constant S6 is a constant depending on the heat conductivity of the material.

As a condition for increasing the amount of molten metal flow in downslope portion DS of Embodiment 1, when thickness of battery case bottom portion 13 is B, 0.5×B≤h6≤0.97×B, and 0.5×B≤(S6/k6)W3≤0.97×B.

Further, as a condition for increasing the amount of molten metal flow in downslope portion DS as compared with Embodiment 1, W3>W.

Weld outer appearance width W3 of downslope portion DS in Embodiment 2 is a width that satisfies the above equation.

In addition, since the scanning speed of only downslope portion DS decreases, a large down in productivity is not generated.

When laser scanning speed $V_1$=200 mm/s, when joining output P1=850 W, welding width W=0.15 mm and when the welding width of downslope portion DS nearly doubled W3=0.2 mm, the laser scanning speed is a half of $V_4$=100 mm/s, and the laser output is also a half of P6=400 W, welding width W3=0.2 mm is obtained. The penetration depth at this time is h6=0.15 mm.

When weld outer appearance length L=2.14 mm, the welding time is TP1+TP2+TP3=0.1 msec+10 msec+0.08 msec=10.9 msec, at S0=0.1 mm, S3=2 mm, S4=0.04 mm, in Embodiment 1, when TP1=0.5 msec, TP2=10 msec, TP3=0.2 msec, the welding time is longer than welding time 10.7 msec calculated as TP1+TP2+TP3=0.5 msec+10 msec+0.2 msec=10.7 msec, but the production time is sufficiently shorter than 21.4 msec in a case where weld outer appearance length L=2.14 mm, at V=100 mm/s in a case where the laser scanning speed is slow overall.

In Embodiment 2, the laser output decreases from laser output P1 to laser output P6 during $\Delta t_4$ (that is, during third period TP3), and the laser scanning speed also decreases from scanning speed $V_1$ to scanning speed $V_4$ and the scanning speed is slowed, and thus the amount of the molten metal flow can increase the heat conduction to the surroundings. As a result, it is possible to further increase the amount of molten pool (amount of molten metal flow) in downslope portion DS than in Embodiment 1.

As described above, in Embodiments 1 and 2, generation of perforation during laser welding of battery case bottom portion 13 can be suppressed, and leakage of the electrolyte can be prevented. Leakage of the electrolyte becomes difficult to use for a long period of time in an electronic device or vehicle due to deterioration of battery performance or corrosion generation of surrounding metal components. In addition, the electrolyte is harmful to the human body. In addition, leakage in the process at the time of battery production is likely to generate corrosion of the equipment in the process or corrosion of other batteries, the perforation of battery case bottom portion 13 should never flow to the post process.

By suitably combining arbitrary embodiments or modification examples of the various embodiments described above or modification examples, it is possible to achieve the respective effects possessed by the embodiment. In addition, combinations of the embodiments, combinations of the examples, or combinations of the embodiments and the examples are possible and combinations of features in different embodiments or examples are also possible.

According to the welded structure of the present disclosure and the manufacturing method thereof, generation of keyholes can be suppressed and the present invention can be also applied to laser welding applications with the high robustness of batteries, electronic components, or the like.

Although the present disclosure has been described with reference to the aforementioned embodiments, this description is not meant to be construed in a limiting sense. Various modifications of the disclosed embodiments as well as alternative embodiments of the invention will become apparent to persons skilled in the art. It is therefore contemplated that the appended claims will cover any such modifications or embodiments.

What is claimed is:

1. A welded structure comprising:
a welded portion in which a battery case and an electrode tab are joined to each other so that an inner surface of the battery case is in contact with the electrode tab,
wherein the welded portion continuously extends from an outer surface of the battery case to an inside of the electrode tab,
the welded portion has a first downslope portion a second downslope portion, a middle portion and a slope portion, the second downslope portion being positioned on an outside of the first downslope portion in a side region of the welded portion in a cross section of the electrode tab in a thickness direction, the middle portion being positioned adjacent to the first downslope portion, and the slope portion being positioned adjacent to the middle portion on an opposite side from the first downslope portion,
the first downslope portion is present in both the electrode tab and the battery case and a thickness of the first downslope portion gradually becomes thinner toward the outside of the first downslope portion,
the second downslope portion is present only inside the battery case and an amount of change in thickness of the second downslope portion is less than an amount of change in thickness of the first downslope portion,
the middle portion is present only in the electrode tab,
the slope portion is present in both of the electrode tab and the battery case, and
a volume of the welded portion corresponding to the slope portion is smaller than a total volume of the welded portion corresponding to the first downslope portion and the welded portion corresponding to the second downslope portion.

2. The welded structure of claim 1,
wherein a thickness of the second downslope portion is 50% or more and 97% or less than a thickness of the battery case.

3. The welded structure of claim 1,
wherein a thickness of the second downslope portion is constant.

4. The welded structure of claim 1,
wherein a width of an outer appearance of the welded portion corresponding to the second downslope portion of the welded portion on the outer surface of the battery case is larger than a width of an outer appearance of the welded portion corresponding to the middle portion, the width extending in a direction transverse to a direction in which the first and second downslope portions, the middle portion and the slope portion sequentially extend.

5. The welded structure according to claim 1, wherein the first downslope portion transitions to the second downslope portion at an inflection point located in the battery case.

6. The welded structure according to claim 1, wherein a thickness of the middle portion is substantially constant.

7. The welded structure according to claim 1, wherein a thickness of the first downslope portion and the second downslope portion changes.

8. The welded structure according to claim 1, a transition between each of the first downslope portion, the second downslope portion, the middle portion and the slope portion comprised an inflection point.

9. The welded structure according to claim 1, the welded portion being welded by a laser beam having different outputs for at least two of the first downslope portion, the second downslope portion, the middle portion and the slope portion.

* * * * *